United States Patent
Skerlan

(10) Patent No.: US 10,361,604 B1
(45) Date of Patent: Jul. 23, 2019

(54) ELECTROMAGNETIC GRAVITY DRIVEN GENERATOR

(71) Applicant: Jim Skerlan, Binbrook (CA)

(72) Inventor: Jim Skerlan, Binbrook (CA)

( * ) Notice: Subject to any disclaimer, the term of this patent is extended or adjusted under 35 U.S.C. 154(b) by 0 days.

(21) Appl. No.: 15/674,874

(22) Filed: Aug. 11, 2017

Related U.S. Application Data

(63) Continuation-in-part of application No. 14/742,563, filed on Jun. 17, 2015, now abandoned.

(51) Int. Cl.
*H02K 7/06* (2006.01)
*H02K 7/18* (2006.01)
*H02K 33/00* (2006.01)

(52) U.S. Cl.
CPC .......... *H02K 7/061* (2013.01); *H02K 7/1807* (2013.01); *H02K 33/00* (2013.01)

(58) Field of Classification Search
CPC ....... H02K 7/061; H02K 7/1807; H02K 33/00
USPC .............................................. 290/1 A, 44, 55
See application file for complete search history.

(56) References Cited

U.S. PATENT DOCUMENTS

| | | | | |
|---|---|---|---|---|
| 4,121,420 A * | 10/1978 | Schur | | F03G 3/00 60/531 |
| 4,311,918 A * | 1/1982 | Vaseen | | F03D 1/00 290/55 |
| 5,070,875 A * | 12/1991 | Falck | | A61B 3/16 600/405 |
| 5,221,868 A * | 6/1993 | Arman | | F03G 3/00 310/81 |
| 6,160,336 A * | 12/2000 | Baker, Jr. | | G21K 1/00 290/55 |
| 6,237,342 B1 * | 5/2001 | Hurford | | F03G 3/00 60/721 |
| 7,973,420 B2 * | 7/2011 | Scott | | F03G 3/00 290/1 A |
| 2003/0155770 A1 * | 8/2003 | Clinch | | F03G 3/00 290/1 R |
| 2004/0113430 A1 * | 6/2004 | Clinch | | F03G 3/00 290/1 R |
| 2010/0230964 A1 * | 9/2010 | Sachs | | F03B 13/20 290/42 |
| 2012/0061959 A1 * | 3/2012 | Yasugi | | H02P 9/10 290/44 |
| 2013/0320790 A1 * | 12/2013 | Aoi | | H02K 7/063 310/81 |
| 2013/0341934 A1 * | 12/2013 | Kawanishi | | B60L 8/00 290/1 A |

* cited by examiner

*Primary Examiner* — Charles Reid, Jr.
(74) *Attorney, Agent, or Firm* — Edwin D. Schindler

(57) ABSTRACT

A gravity driven generator include a wheel hub surrounded by a circular wheel frame having a plurality of radial spokes extending from the hub to the frame and each carrying a movable weight that is impelled from a resting position proximate the hub to an extended position proximate the frame as the wheel rotates from the 12 o'clock position to the 6 o'clock position. This results in placing the overall structure out-of-balance and causes rotation. The movable weight are impelled inward from the 6 o'clock position to the 12 o'clock position. The rotating hub is connected to generators, such as geared generators, to produce electrical power. In a preferred embodiment, the movable weight are carried on tracks and impelled by electromechanical induction devices.

6 Claims, 6 Drawing Sheets

ELECTROMAGNETIC GRAVITY DRIVEN GENERATOR

CROSS-REFERENCE TO PRIOR APPLICATION

This is a continuation-in-part of U.S. patent application Ser. No. 14/742,563, filed Jun. 17, 2015, now abandoned.

BACKGROUND OF THE INVENTION

The present invention relates generally to energy production and, more specifically, to energy production using a rotating wheel frame having a plurality of radial arms extending between said frame and a hub mounted onto an axle that extends through distal bearings to respective U-Joint's fastened to respective generator gear boxes generating electricity shunted to storage devices and/or incorporating a grid-tie inverter for synchronizing the generated current with the grid current.

Each of the radial arms further provide a weight and induction electromagnet(s) for moving said weight from a predetermined seated retracted position to a predetermined extended position.

Frame rotation is caused by energizing the electromagnets to push pull the weights from a seated position (approx. the hub) to an extended position in a predetermined order as the frame arms cycle through 360° electromagnetically moving the arm's weight from the seated position, (approx. 12 o'clock), to an extended position beyond the frame periphery as the arm moves through a first and second quadrant then electromagnetically returned to its seated position as it moves into the third quadrant (approx. 6 o'clock) wherein the weight remains through the forth quadrant rotation completing one cycle.

Extending the weights through a half-cycle creates an imbalance in the frame's opposing side forces whereby gravity rotates the frame and axle as the system attempts to return to equilibrium, which will continue generating electricity as the weights are electromechanically moved from an internal seated position to an extended position approximately through first and second quadrants then moved to a seated position approximately through the third and fourth quadrant.

SUMMARY OF THE INVENTION

A primary object of the present invention is to provide a system for generating electricity through generators in mechanical linkage with a rotating frame that is perpetually out of balance due to selectively extending and retracting weights through a portion of the frame's 360° rotation.

Another object of the present invention is to provide an electricity generating system comprising a frame having a plurality of radial arms extending to a hub fixedly attached to an axle that then extends through a pair of spaced bearings terminating in respective U-Joints in mechanical linkage with respective generators.

Yet another object of the present invention is to provide an electricity generating system further providing each arm with a carriage supported weight with the carriage wheels riding in a track.

Still yet another object of the present invention is to provide an electricity generating system further providing each arm with one or more electromagnets having a power source and circuit for extending an arm weight from a seated position to an extended position as it rotates through a first and second quadrant then retracted as its moves into the third quadrant and through the fourth quadrant completing one frame revolution.

Additional objects of the present invention will appear as the description proceeds.

The present invention overcomes the shortcomings of the prior art by providing rotating frame having a plurality of radial arms extending between said frame and a hub mounted onto an axle that extends through distal bearings to respective U-joint's fastened to respective generator gear boxes generating electricity shunted to storage devices and/or incorporating a grid-tie inverter for synchronizing the generated current with the grid current. Each of the radial arms further provides a weight and electromagnet(s) for moving said weight.

The present invention, as broadly defined, provides a gravity driven generator, which includes a base supporting a rotating central wheel hub and a rotating outer circular wheel frame having a plurality of radial arms extending between the central wheel hub and the outer circular wheel frame. A plurality of movable weights is provided with each of the movable weights being located on a track on one of the radial arms and with each of the movable weights having a first, resting position, wherein the movable weight is located proximate the central wheel hub and, further, wherein each of the movable weights has a second, extended position located proximate the outer circular wheel frame and each track on each of the radial arms is able to carry the movable weight between the first resting position and the second extended position. Movable weight positioning means is used for moving each of the movable weights along each track from both the resting position to the extended position and from the extended position to the resting position and, further, each of the radial arms is located between the rotating central wheel hub and the rotating outer circular wheel frame and move through four defined quadrants, wherein the first defined quadrant extends from a 12 o'clock position to a 3 o'clock position, the second defined quadrant extends from the 3 o'clock position to a 6 o'clock position, the third defined quadrant extends from said 6 o'clock position to a 9 o'clock position and the fourth defined quadrant extends from the 9 o'clock position to the 12 o'clock position. An external energy source is provided for initiating movement of, and moving, as required, the plurality of movable weights via the movable weight positioning means, whereby when one of the radial arms is in the first or the second quadrant, the movable weight positioning means moves the movable weight along the track from the resting position to the extended position and when one of the radial arms is in the third or the fourth quadrant, the movable weight positioning means moves the movable weight along the track from the extended position to the resting position, thus rotating the central wheel hub for creating power only to the extent that energy provided by the power generated does not exceed total amount of energy used to create the power so generated. The external energy source may be, for example, electrical power, created by burning a fossil fuel or wind-powered.

Frame rotation is caused by energizing the electromagnets to push or pull the weights from their seated position to an extended position in a predetermined order as the arms cycle through 360° electromagnetically moving the arm's weight from the seated position to an extended position beyond the frame periphery as the arm moves through a first and second quadrant then electromagnetically returned to its seated position as it moves into the third quadrant where the weight remains through the forth quadrant rotation completing one cycle.

It is thus desirable to provide a device for generating electricity comprising a gravity driven rotating frame fixedly attached to an axle in mechanical linkage with a pair of distal end generators.

It is further desirable to provide said frame with a plurality of radial arms with each having a weight that is moved during frame rotation from a seated position to an extended position causing an imbalance of opposing forces where then gravity moves the extended weighted side with the extended weighted side continuously extending and retracting weights through an approximate first half-cycle then remaining retracted through the remainder of the 360° cycle perpetually keeping the frame out of balance so long as the weights are continuously extended then retracted using the force of gravity to rotate the frame and axle in mechanical communication with the generators.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Figure 1:
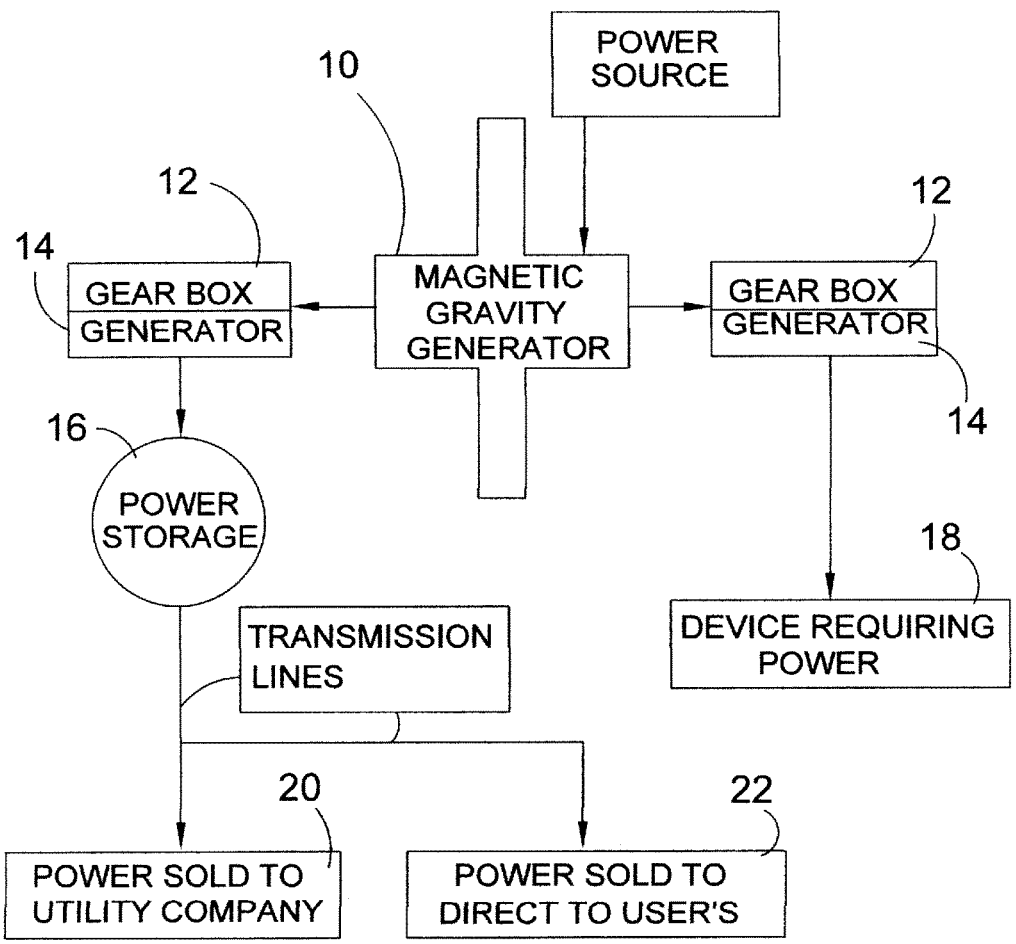
FIG. 1 is a flow chart of the present invention.

Turning now descriptively to the drawings, in which similar reference characters denote similar elements throughout the several views, the figures illustrate the use of the present invention. With regard to the reference numerals used, the following numbering is used throughout the various drawing figures:

10 gravity driven power generator
12, 14 generators
16 power storage unit
18 power using devices
20 excess power transmitted to utility
22 excess power transmitted to user
24 movable weights
26 wheel hub
28 circular wheel frame
30 electromagnetic mechanism
32 wheel support
34 wheel brace
36 12 o'clock position
38 3 o'clock position
40 6 o'clock position
42 9 o'clock position
44 radial arm compartment
46 movable weight track
48 geared generator
50 movable weight extended position
52 movable weight retracted position
A1 1st quadrant directional arrow
A2 2nd quadrant directional arrow
A3 3rd quadrant directional arrow
A4 4th quadrant directional arrow
A5 movable weight rotation arrow

DETAILED DESCRIPTION OF THE DRAWING FIGURES AND PREFERRED EMBODIMENTS

Turning, now, in detail to FIG. 1, shown is a flow chart of the present invention. The present invention is an electromagnetic gravity driven power generator system 10 having a wheel structure (detailed further below) with a plurality of compartments, each having a carriage and track with weights bolted to said carriage. The wheel rotates on a center hub shaft attached to drive shafts and universal joints to gear boxes and generators 12, 14, located proximate the wheel. An electromagnetic force is applied to the weight. The magnetic force pushes each weight outward a certain distance and can pull back the weight to a retracted position using a magnetic force of opposite polarity. This movement of the weights turns the entire wheel structure and powers the generators. The present invention is also contemplated to include a power storage unit 16, power outlets to various devices indicated at 18, and an ability to provide excess power to both utilities, indicated at 20 and other users, indicated at 22.

Figure 2:
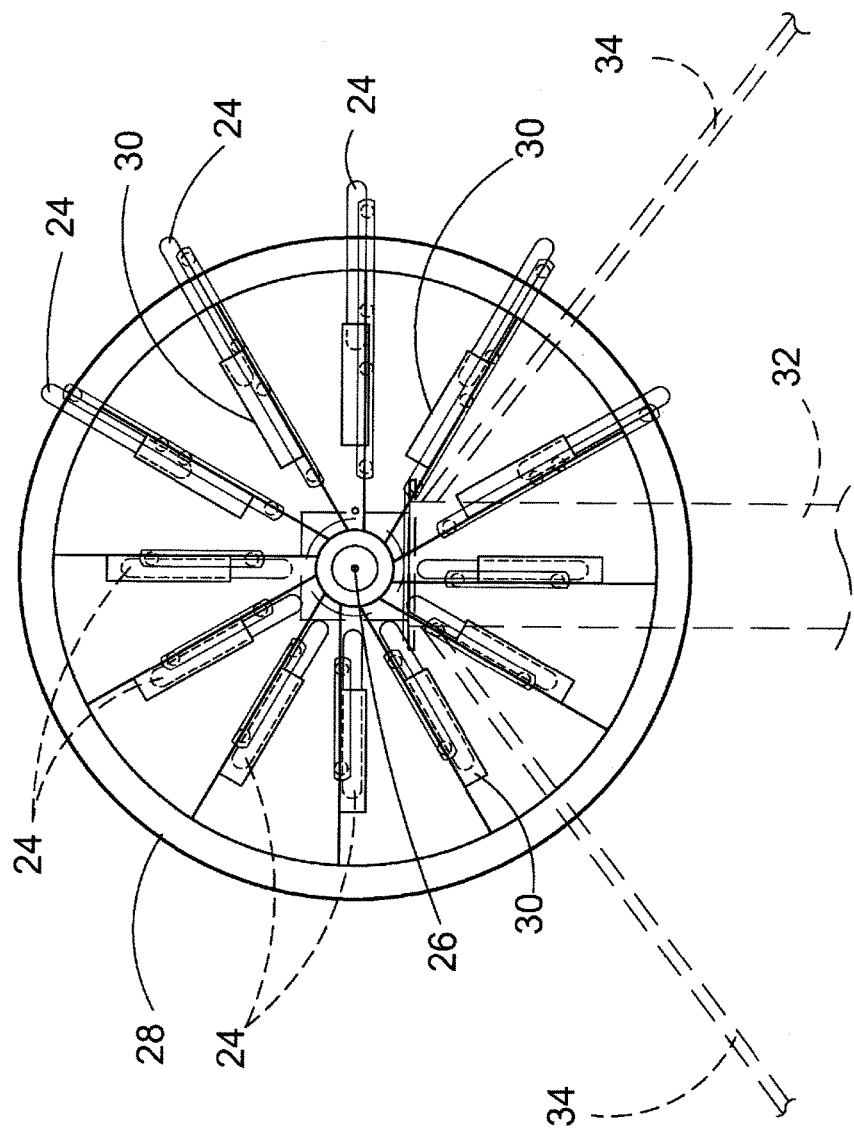
FIG. 2 is a front view of an embodiment of the gravity powered generator.

Referring to FIG. 2, shown is a front view of an embodiment of the gravity powered generator indicated at 10. The generator 10 is provided with a wheel hub 26 and generally circular frame 28. A plurality of arms (discussed further below) each carry both a movable weight 24 and an electromagnetic mechanism 30. The generator 10 also includes a support indicated at 32 and braces indicated at 34. The electromagnetic mechanism 30 moves the weights 24 from a seated to an extended position as needed. This will be discussed below. The wheel hub 26 is attached to drive shafts and universal joints that are arranged to provide power.

Figure 3:
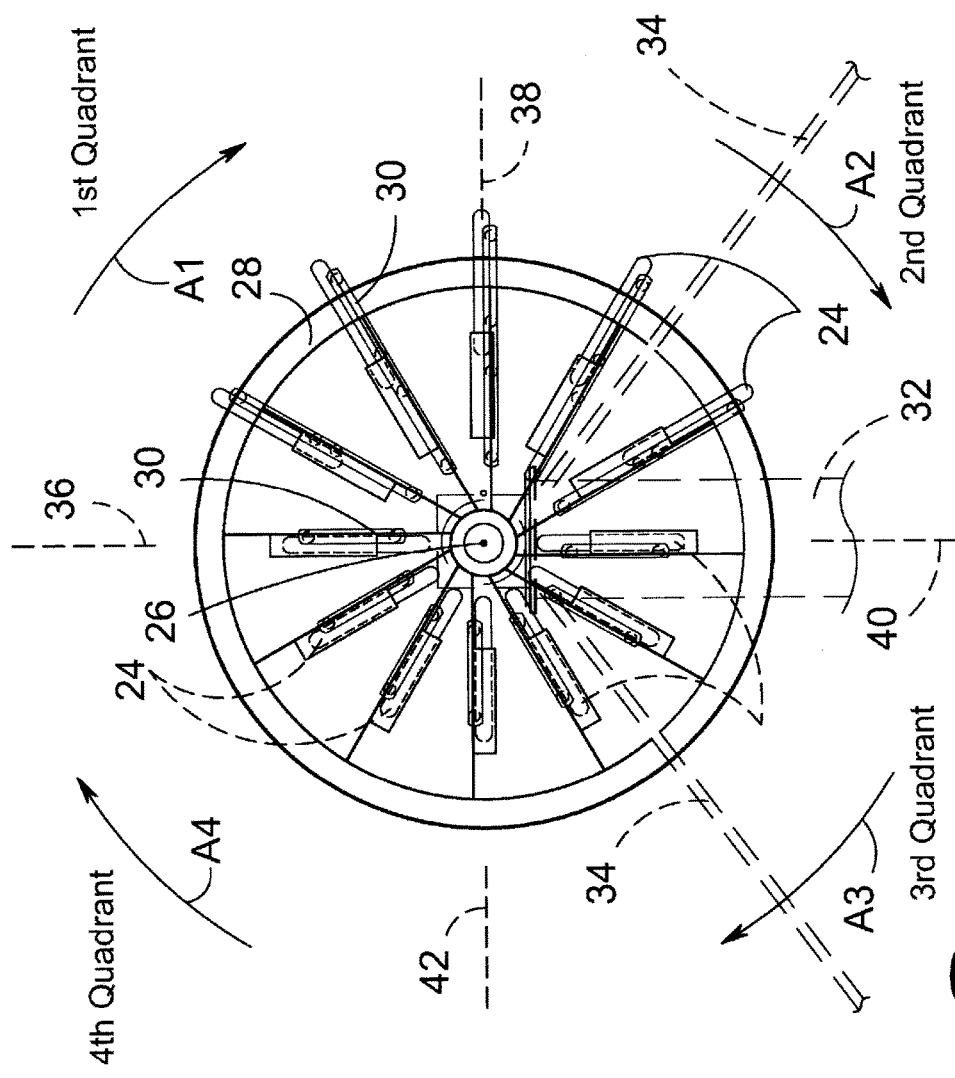
FIG. 3 is an overview of arm weight positions during one frame rotation.

Concerning FIG. 3, shown is an illustrative view of arm weight positions during one frame rotation. The arm positions in the Figure can be roughly defined by four quadrants. From the 12 o'clock position 36 to the 3 o'clock position 38 is the 1st quadrant. From 3 o'clock 38 to 6 o'clock 40 is the 2nd quadrant. The 3rd quadrant is marked by the 6 o'clock position 40 and the 9 o'clock position 42 and lastly the 9 o'clock position to the 12 o'clock position defines the 4th quadrant. Note that in the 1st Quadrant, the movable weights 24 are in their extended position: that is moved out to the vicinity of the circular wheel frame 28. The same applies to the 2nd Quadrant. In the 3rd and 4th Quadrants, the movable weights 24 are in their retracted positions, closer to the wheel hub 26. The present invention rotates due to the movement of these weights 24 as is indicated by the 1st through 4th Quadrant directional arrows A1, A2, A3, and A4, respectively. The movement of the weights 24 is accomplished through electromagnetic induction mechanisms 30 locate between the wheel hub 26 and the circular wheel frame 28. These electromagnetic mechanisms 30 propel the weights 24 in or out as necessary along a track (discussed in the Figures below) to drive the circular wheel frame, thus powering the geared generators 12, 14 attached to the hub 26. It should be noted that the movable weights 24 could be retraced and extended by other means. Hydraulic pistons, sensing solenoids, and the like could be utilized without departing from the spirit of the invention. As can be seen in the Figure, the extension of the weights throws the wheel frame 28 out of balance, driving the rotation of the device.

Figure 4:
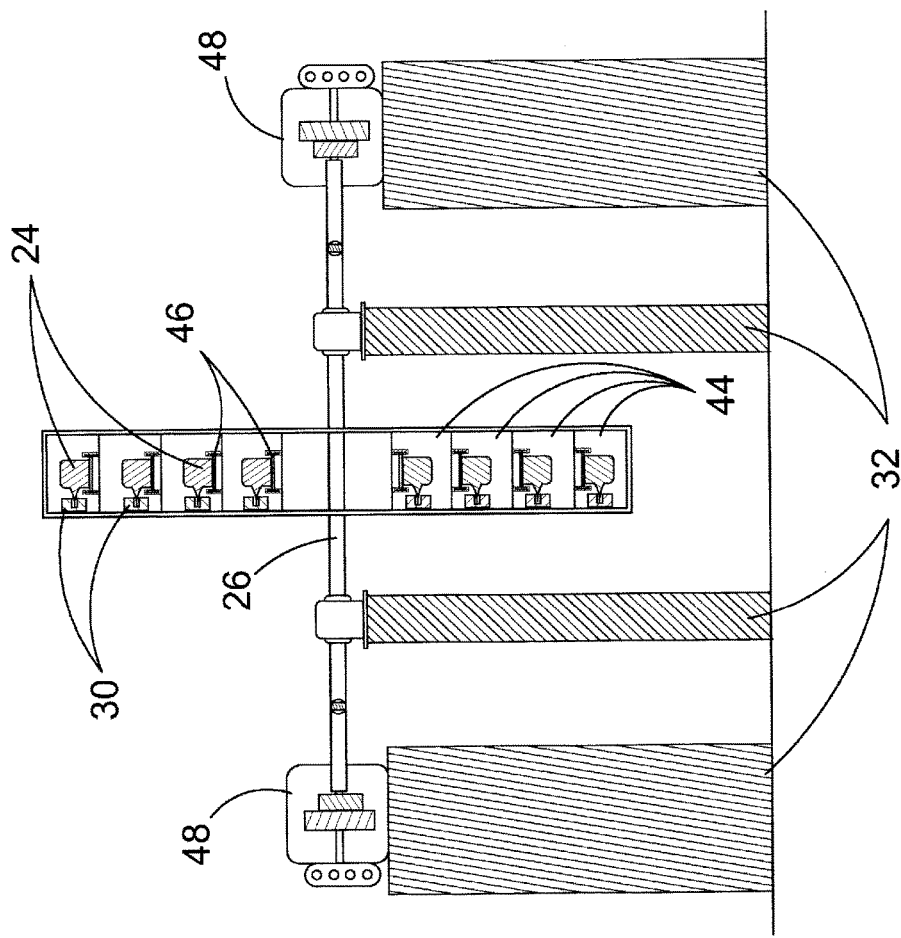
FIG. 4 is a side view of frame power generation showing compiled arm end views of the frame having a plurality of channeled radial arms.

FIG. 4 presents a side view of the frame power generator showing compiled arm end views of the frame having a plurality of channeled radial arms each of which is indicated at 44. The present invention provides a plurality of radial arm compartments 44 with an electromagnet mechanism 30 cycling the movable weights 24 from a starting point (seen in FIG. 3) to a outer predetermined position proximate the circular wheel frame 28 (also seen in FIG. 3) through one frame revolution. The weights 24 move along the movable weight tracks 46. This provides the impetus to rotate the frame as seen in the previous Figures and thus drive the hub 26 and subsequently the gears and generators 48 to provide power.

Figure 5:
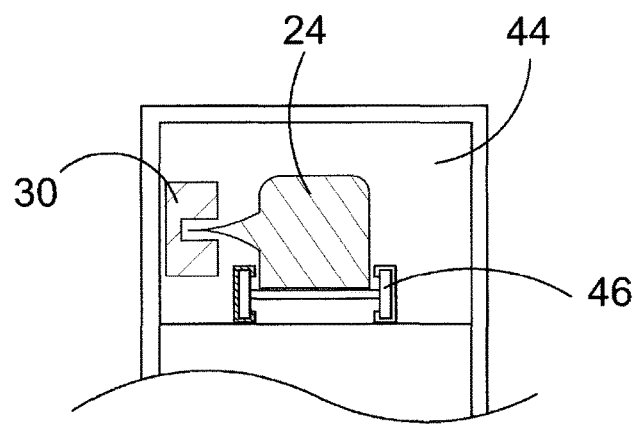
FIG. 5 is an enlarged sectional end view of a frame arm carriage compartment; and, FIG. 6 is a side view of electromagnetically induced weight displacement using gravity as motive force driving at least one generator linked thereto.

Referring to FIG. 5, shown is an enlarged sectional end view of a frame arm carriage compartment 44. The arm compartment 44 includes an induction electromagnet 30 for moving a weight 24 from a stationary starting point to an extended point then back to its starting position as the arm weight moves through one frame rotation (Quadrants 1-4 as seen in FIG. 3).

Figure 6:
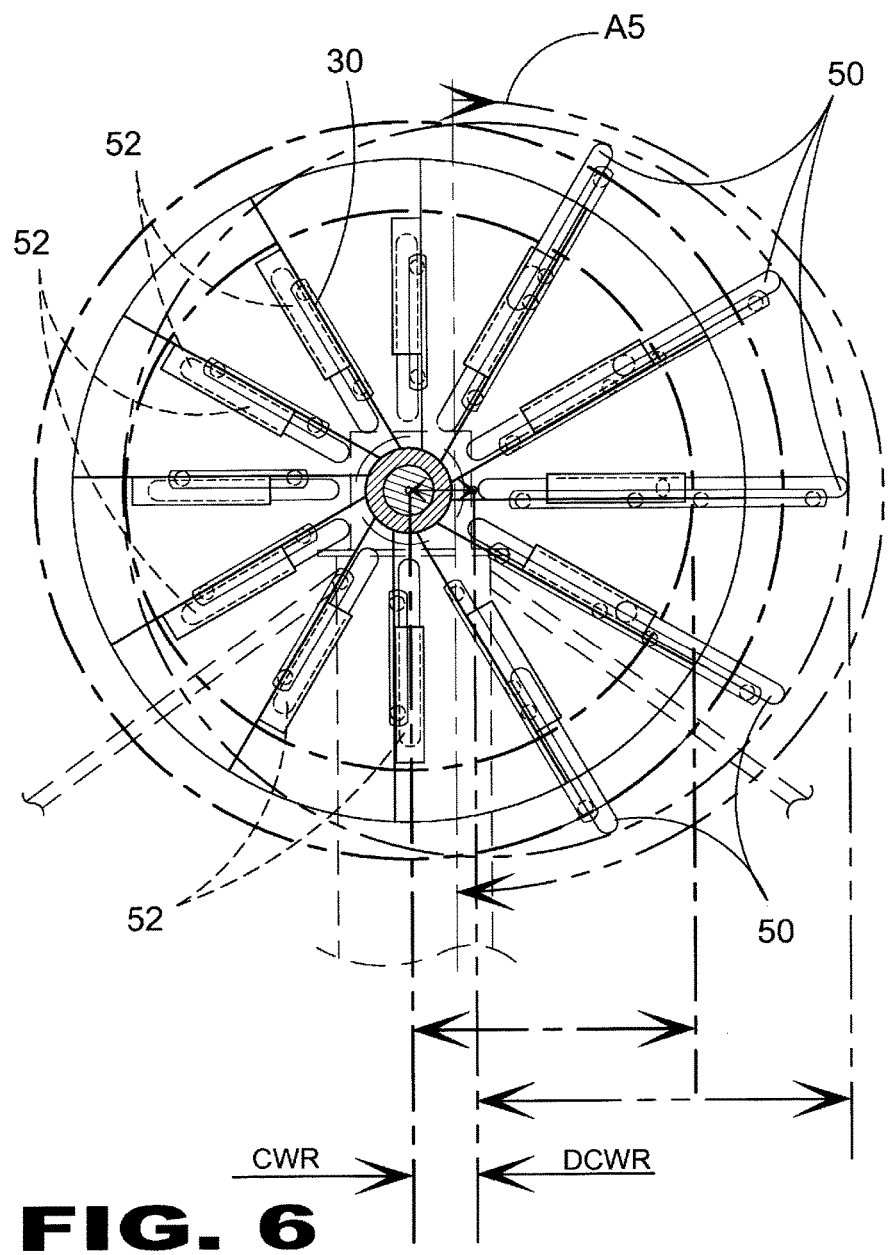

FIG. 6 provides a front view of the present invention electromagnetically induced weight displacement using gravity as motive force to drive at least one generator linked thereto. When all weights are seated, the center of weight revolution (CWR) corresponds to the center point of the axle and center point of frame system gravity (system balanced). By extending arm weights as they pass through a first and second quadrant displaces the CWR away from the frame center of gravity a distance approximately equal to the largest distance a weight moves from the seated to its extended position creating a displaced center of weight revolution ((DCWR)-(system imbalance)), thereby causing gravitational torque to continuously rotate the frame as a predetermined number of weights are extended through the first and second quadrants and retracted through the third and fourth quadrants (Quadrants seen in FIG. 3). Note the movable weight extended positions 50 in the Figure and the movable weight retracted positions 52.

The hub 26 rotates and drives geared generators 48 as seen in FIG. 4. Referring to FIG. 1 it can be seen that the power generated by these units may be used to power a local appliance, may be stored, or be transmitted to a remote location.

While only several embodiments of the present invention have been shown and described, it will be obvious to those skilled in the art that many modifications may be made to the present invention without departing from the spirit and scope thereof.

What is claimed is:

1. A gravity driven generator, comprising:
   a base supporting a rotating central wheel hub and a rotating outer circular wheel frame having a plurality of radial arms extending between said central wheel hub and said outer circular wheel frame;
   a plurality of movable weights, each of said movable weights being located on a track on one of said radial arms and each of said movable weights having a first, resting position wherein said movable weight is located proximate said central wheel hub and further wherein each of said movable weights has a second, extended position located proximate said outer circular wheel frame and wherein each said track on each said radial arm is able to carry said movable weight between said first resting position and said second extended position;
   movable weight positioning means for moving each of said movable weights along each said track from both said resting position to said extended position and from said extended position to said resting position and further where each of said radial arms located between said rotating central wheel hub and said rotating outer circular wheel frame move through four defined quadrants, wherein said first defined quadrant extends from a 12 o'clock position to a 3 o'clock position, said second defined quadrant extends from said 3 o'clock position to a 6 o'clock position, said third defined quadrant extends from said 6 o'clock position to a 9 o'clock position, and said fourth defined quadrant extends from said 9 o'clock position to said 12 o'clock position; and,
   an electro-magnetic mechanism applies a magnetic force, as required, for effecting movement of said plurality of movable weights via said movable weight positioning means,
   whereby when one of said radial arms is in said second or said third quadrant, said movable weight positioning means moves said movable weight along said track from said resting position to said extended position and when one of said radial arms is in said fourth quadrant or said first quadrant, said movable weight positioning means moves said movable weight along said track from said extended position to said resting position, thus rotating said central wheel hub for creating power only to the extent that energy provided by the power generated does not exceed total amount of energy used to create the power so generated.

2. The gravity driven generator according to claim 1, wherein said rotating central wheel hub and a rotating outer circular wheel frame are supported on the base and where said rotating central wheel hub is connected through a plurality of gears to at least one generator.

3. The gravity driven generator according to claim 2, wherein said generator is connected to a power storage device.

4. The gravity driven generator according to claim 2, wherein said generator is connected to a power transmission line.

5. The gravity driven generator according to claim 2, wherein said movable weight positioning means is hydraulic.

6. The gravity driven generator according to claim 2, wherein said movable weight positioning means is electro-mechanical.

* * * * *